Patented July 12, 1932

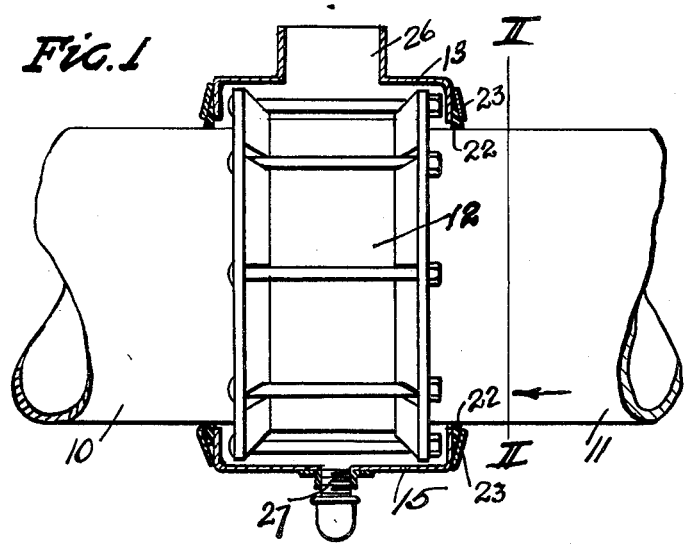
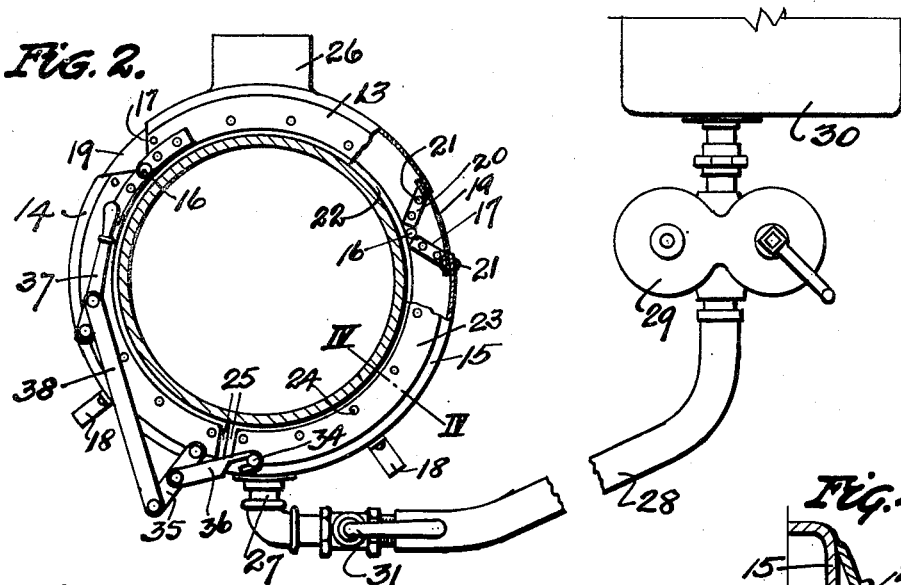
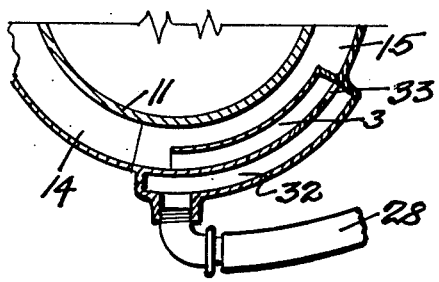
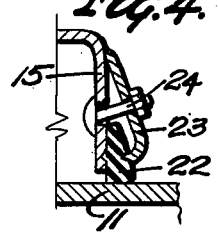

1,867,476

UNITED STATES PATENT OFFICE

LORLYS R. ROGERS, OF GREENVILLE, MISSISSIPPI, ASSIGNOR TO WAILES DOVE-HERMISTON CORPORATION, OF NEW YORK, N. Y., A CORPORATION OF NEW YORK

DEVICE AND METHOD FOR COATING PIPE JOINTS AND PIPES

Application filed November 15, 1928. Serial No. 319,528.

This invention relates to improvements in means for coating or painting pipe couplings and for coating the exterior of pipes with a bituminous coating such as tar or asphalt, or with other coating, and to the method by which the bitumen, or other coating is applied.

When pipe such as is used for the transmission of gas under pressure is joined together in the field, the coupling commonly used is held together and clamped on the pipe by bolts which make a coupling that is difficult to thoroughly coat and protect. Ordinarily in such practice the ends of the pipe have been left unprotected and the necessity for such coating is great. The difficulty of coating the coupling is much accentuated by reason of the fact that the pipe is often, if not ordinarily assembled in the ditch and to get underneath and apply the coating to the lower portions of the coupling is almost impossible. This invention therefore relates to the device used in coating such couplings and to the method of applying the coating. Obviously it may also be used for coating straight sections of the pipe also and it therefore relates to such means and methods.

The objects of my invention are:

(a) To provide a device by which the coupling or a section of the pipe to be coated, may be completely enclosed whereby a pipe coating may be forced into and around the parts of the coupling or around a section of the pipe, and thereafter surplus coating may be removed, leaving on the coupling or pipe only such coating as may adhere thereto;

(b) To provide improvement in the details and construction of such a device; and (c) To provide a method for applying such a coating.

The means by which the foregoing and other objects are accomplished and the manner of their accomplishment will readily be understood from the following specification on reference to the accompanying drawing, in which:

Fig. 1 is a side elevation of abutting ends of two joints of pipe with a typical coupling joining the two and a sectional elevation of the coating form in place and enclosing the coupling.

Fig. 2 is a sectional elevation taken as on the line II—II of Fig. 1, looking in the direction of the arrow, showing the form in place on the pipe with a small portion of the form in section, and diagrammatically illustrating a supply tank for the coating material, and a pump for forcing the coating material into the form and withdrawing it therefrom.

Fig. 3 is a fragmentary section, illustrating a modification of the construction of the pipe connection with the form.

Fig. 4 is an enlarged fragmentary sectional detail of the form taken as on the line IV—IV of Fig. 2, showing a typical means of sealing the form to the pipe.

Referring now to the drawing, 10 and 11 represent adjacent ends of joints of pipe which have been connected together by a coupling 12, such as is ordinarily used for the purpose and which pipe ends and coupling are to be coated. 13, 14 and 15 are sections of a form or casing which is adapted to surround the coupling 12 and to clamp tightly around and against the pipes adjacent the ends of the coupling. Each of these sections is preferably made of sheet metal and is channel shaped in cross section, the channel being curved to conform to the curvature of the pipe, and the sections 14, and 15 are each pivoted to the section 13 as by the pivots 16. From the pivot point each section is cut away along an inclined line 17 so that sections 14 and 15 may be swung apart when the form is to be placed over and closed around the pipe, or is to be opened up and removed therefrom. Handles 18 are provided on the sections 14 and 15 by which this placing or removal may be accomplished. Bridging the openings where the sections are cut away at the joints, are canvas covers 19 which fold or collapse to permit swinging of the sections with reference to each other. The canvas is preferably clamped against the metal of the cover by metal strips 20 held in place by rivets 21.

The joint between the various sections 13, 14 and 15 of the form and the pipe is made by rubber gaskets 22 which are preferably held by clamping rings 23 and bolts 24, and the ends of the sections 14 and 15 where they come together are provided with rubber gaskets 25 substantially identical with the gaskets 22 and held in similar manner.

26 is a riser pipe extending upward from the section 13, and 27 a supply pipe leading into the lower end of the section 15. This supply pipe is connected by a flexible hose 28 with a rotary pump 29, the pump being fed by gravity from a supply tank 30. If desired a cut-off valve 31, may be placed in the hose line to cut off return flow when the form is opened up.

In Fig. 3, I show a modification of the manner in which the hose 28 is connected into the form 15. In this case the hose is connected into an arcuate chamber 32 lying outside of the section 15, and this chamber in turn is connected through an opening 33 into a similar arcuate chamber lying within the section 15. The latter arcuate chamber discharges into the form substantially in line with the hose entrance into the chamber. The purpose of this modification being to trap any liquid which is in the pipe 28 and prevent its running back into the form 15 when the same is disconnected from the section 14 and to thereby dispense with the need of a cut-off valve.

Sections 14 and 15 are clamped together, to secure the form around the pipe and to thereby make a continuous annular enclosure about the coupling 12, by a latch, which comprises a pin 34 on the section 15, an arm 35 pivotally mounted on the section 14, and a hook 36 which is pivoted to the arm 35 and is adapted to be hooked over the pin 34 so that a pull on the end of the arm 35 will draw the sections 14 and 15 together. As these parts are more or less inaccessible, I prefer to pivot a hand lever 37 to the section 14, at a more accessible point, and to connect this arm by a link 38 with the end of the arm 35. To clamp the parts together the hook 36 is engaged with the pin 34 and the lever 37 swung around to the position shown which is past dead center and will hold the parts firmly locked together.

In using the device the form comprising the three sections 13, 14 and 15 is placed over the pipe and the coupling 12, and is clamped therearound to form an annular chamber surrounding the coupling. The valve 31 is opened and the pump 29 operated by means of the hand lever until the entire form is filled and the coating begins to rise in the riser pipe 26. Thereafter the pump is reversed and operated until the form is entirely empty, the liquid being forced by the pump back into the tank. The valve 31 is then closed, the latch released and the form sections swung apart and removed from the pipe. The form may then be moved together with the tank to other couplings and the operation repeated.

In coating a pipe as distinguished from a coupling the same procedure is followed except that in such case the form is ordinarily made much longer than for a coupling. It is firmly clamped around the pipe, a section is coated, the form is shifted and again clamped and an additional section coated, and the operation repeated.

It will be understood that ordinarily the coating used is hot tar or asphalt and that in such case the tank 30 must be heated to keep the tar or asphalt as the case may be in a liquid condition, but such heater, and the means for mounting and transporting the tank, form no part of this invention and are therefore not shown. In some cases also cut back tar or asphalt is used and it will of course be readily understood that any other form of paint or coating may similarly be applied.

It will further be understood that while I have described the form as made up of three sections that I have also built it of two and four sections and have shown three merely as illustrative. The various details also, including the latch, are illustrative only and it will be clearly understood that the claims will not be limited by such detail unless it is specifically set out therein.

Having described my invention, what I claim is:

1. An annular form for use in coating pipe couplings or pipe; comprising a plurality of arcuate sections, channel shaped in cross section with the channel legs projecting inward, hinges each connecting a section to an adjacent section, two of said sections having an unhinged end each, means for clamping said unhinged ends together to complete said annular form, gaskets projecting inward from said channel legs to form a seal between said form and said pipe when said form is clamped thereon, gaskets forming a seal between said clamped ends, and flexible material completing said annular form at said hinged joints, one of said sections having an opening therein for the introduction of coating material.

2. An annular form for use in coating pipe couplings or pipe; comprising a plurality of arcuate sheet metal sections, channel shaped in cross section with the channel legs projecting inward, hinges each connecting a section to an adjacent section, two of said sections having an unhinged end each, means for clamping said unhinged ends together to complete said annular form, gaskets projecting inward from said channel legs to form a seal between said form and said pipe, when said form is clamped thereon, gaskets forming a seal between said clamped ends, and flexible material completing said annular form at said hinged points, the lower of said sections, when said form is in place, having an opening therein at substantially the lowest point.

3. An annular form for use in coating pipe coupling or pipe; comprising a plurality of arcuate sheet metal sections, channel shaped in cross section with the channel legs projecting inward, hinges each connecting a section to an adjacent section, two of said sections having an unhinged end each, means for clamping said unhinged ends together to complete said annular form, gaskets secured to said channel legs to form a seal between said form and said pipe, when said form is clamped thereon, gaskets forming a seal between said clamped ends, and flexible material completing said annular form at said hinged points, one of said sections having an opening therein for the introduction of coating material.

In testimony whereof I hereunto affix my signature.

LORLYS R. ROGERS.